United States Patent
Ferreira Tomaz et al.

(10) Patent No.: US 11,811,888 B2
(45) Date of Patent: Nov. 7, 2023

(54) ENSURING DATA PROTECTION AND CONTROL IN DISTRIBUTED HYBRID MULTI-CLOUD ENVIRONMENT

(71) Applicant: International Business Machines Corporation, Armonk, NY (US)

(72) Inventors: Eduardo Ferreira Tomaz, Sao Caetano do Sul (BR); Adriana Pellegrini Furnielis, Valinhos (BR); Daniel De Souza Casali, Elmhurst, NY (US); Sarvesh S. Patel, Pune (IN); Abhishek Jain, Baraut (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/655,223

(22) Filed: Mar. 17, 2022

(65) Prior Publication Data

US 2023/0300211 A1 Sep. 21, 2023

(51) Int. Cl.
*G06F 15/16* (2006.01)
*H04L 67/53* (2022.01)
(Continued)

(52) U.S. Cl.
CPC .......... *H04L 67/53* (2022.05); *H04L 67/1012* (2013.01); *H04L 67/1097* (2013.01);
(Continued)

(58) Field of Classification Search
CPC ......... H04L 67/51; H04L 67/53; H04L 67/61; H04L 67/567; H04L 67/01; H04L 67/1012; H04L 67/1097
(Continued)

(56) References Cited

U.S. PATENT DOCUMENTS

| 7,464,378 B1 | 12/2008 | Limaye |
| 7,870,230 B2 * | 1/2011 | Rao ..................... H04L 67/1001 709/224 |

(Continued)

OTHER PUBLICATIONS

Astra, "Application data and storage management for cloud native applications", Astra by NetApp, Accessed on Jan. 24, 2022, 4 Pages.

(Continued)

*Primary Examiner* — Bharat Barot
(74) *Attorney, Agent, or Firm* — Stephanie L. Carusillo

(57) ABSTRACT

In an approach for ensuring data protection and control in a distributed hybrid multi-cloud environment with Kubernetes clusters, a processor determines whether a respective quorum of the set of clusters are online. A processor, responsive to determining that a respective quorum of the set of clusters are online, determines whether one or more applications of the cluster are running on another cluster of the set of clusters. A processor, responsive to determining the one or more applications of the cluster are not running on another cluster of the set of clusters, determines whether the cluster is designated as a highest priority cluster. A processor, responsive to determining the cluster is designated as the highest priority cluster, determines whether a main cluster of the set of clusters is online. A processor, responsive to determining the main cluster is online, scales a new custom resource to one (1).

20 Claims, 5 Drawing Sheets

(51) Int. Cl.
- *H04L 67/1012* (2022.01)
- *H04L 67/1097* (2022.01)
- *H04L 67/51* (2022.01)
- *H04L 67/61* (2022.01)
- *H04L 67/567* (2022.01)

(52) U.S. Cl.
CPC ............ *H04L 67/51* (2022.05); *H04L 67/567* (2022.05); *H04L 67/61* (2022.05)

(58) Field of Classification Search
USPC .................................. 709/202–203, 223–224
See application file for complete search history.

(56) References Cited

U.S. PATENT DOCUMENTS

| | | | |
|---|---|---|---|
| 9,774,401 | B1 | 9/2017 | Borrill |
| 10,853,200 | B2* | 12/2020 | Chen ..................... G06F 3/0619 |
| 11,385,938 | B2* | 7/2022 | Kim ........................ H04L 67/51 |
| 2007/0016822 | A1 | 1/2007 | Rao |
| 2011/0179173 | A1* | 7/2011 | Colrain ................. G06F 9/5061 709/226 |
| 2011/0289344 | A1 | 11/2011 | Bae |
| 2013/0145375 | A1 | 6/2013 | Kang |
| 2015/0381589 | A1 | 12/2015 | Tarasuk-Levin |
| 2019/0325155 | A1 | 10/2019 | Wu |
| 2020/0225864 | A1 | 7/2020 | Saad |
| 2020/0278813 | A1 | 9/2020 | Nilsson |
| 2020/0344322 | A1* | 10/2020 | Zhu ..................... H04L 67/1097 |
| 2021/0073177 | A1 | 3/2021 | Chen |
| 2021/0081432 | A1 | 3/2021 | Grunwald |
| 2021/0294655 | A1* | 9/2021 | Bharathi ................. G05B 17/02 |
| 2022/0108031 | A1* | 4/2022 | Saini ..................... H04L 9/0894 |

OTHER PUBLICATIONS

Google, "Persistent volumes and dynamic provisioning", Google, Accessed on Jan. 24, 2022, 9 Pages.

Kumar et al., "Storage Locking for Security", An IP.com Prior Art Database Technical Disclosure, IP.com No. IPCOM000257848D, IP.com Electronic Publication Date: Mar. 15, 2019, 3 Pages.

Prasad, Raghavendra, "Using File Storage Service with Container Engine for Kubernetes", Oracle Cloud Infrastructure Blog, Feb. 8, 2019, 10 Pages.

Red Hat, "What is a Kubernetes cluster?", Red Hat, Jan. 15, 2020, 6 Pages.

Sharif, Ashraf, "Disaster Recovery for Galera Cluster Deployed to a Hybrid Cloud", Severalnines, Mar. 18, 2021, 7 Pages.

Mell et al., "The NIST Definition of Cloud Computing", Recommendations of the National Institute of Standards and Technology, NIST Special Publication 800-145, Sep. 2011, 7 pages.

International Searching Authority, "Notification of Transmittal of the International Search Report and the Written Opinion of the International Searching Authority, or the Declaration," Applicant's or agent's file reference F22W3540, International application No. PCT/CN2023/081392, International filing date Mar. 14, 2023, dated Jun. 14, 2023, 7 pages.

* cited by examiner

US 11,811,888 B2

ENSURING DATA PROTECTION AND CONTROL IN DISTRIBUTED HYBRID MULTI-CLOUD ENVIRONMENT

BACKGROUND OF THE INVENTION

The present invention relates generally to the field of cloud computing, and more particularly to ensuring data protection and control in a distributed hybrid multi-cloud environment with Kubernetes clusters.

A multi-cloud environment exists when an enterprise utilizes multiple public cloud services, most often from different cloud providers. Since all cloud providers are not created equal, organizations adopt a multi-cloud strategy to deliver best of breed IT services, to prevent lock-in to a single cloud provider, or to take advantages of cloud arbitrage and choose providers for specific services based on which provider is offering the lowest price at that time.

A hybrid cloud environment exists when an enterprise's cloud environment includes a private cloud infrastructure such as an enterprise's own data center along with one or more public cloud services, usually working in conjunction to achieve business goals. Thus, if an enterprise's cloud environment includes multiple public cloud services and a private cloud component, then it is considered a hybrid multi-cloud environment.

Kubernetes is an open-source system for managing containerized applications across multiple hosts. It provides basic mechanisms for deployment, maintenance, and scaling of applications. Enterprises offer Kubernetes-based platforms or infrastructure as a service (IaaS) that deploy Kubernetes. When Kubernetes is deployed, a cluster is formed. A Kubernetes cluster consists of at least one worker machine (i.e., node) that run containerized applications. The worker node(s) host the Pods (i.e., the set of running containers in the cluster) that are the components of the application workload. A cluster also includes a control plane that manages the worker nodes and the Pods in the cluster. In production environments, the control plane usually runs across multiple computers and a cluster usually runs multiple nodes, providing fault-tolerance and high availability.

SUMMARY

Aspects of an embodiment of the present invention disclose a method, computer program product, and computer system for ensuring data protection and control in a distributed hybrid multi-cloud environment with Kubernetes clusters. A processor determines whether a respective quorum of the set of clusters are online. A processor, responsive to determining that a respective quorum of the set of clusters are online, determines whether one or more applications of the cluster are running on another cluster of the set of clusters. A processor, responsive to determining the one or more applications of the cluster are not running on another cluster of the set of clusters, determines whether the cluster is designated as a highest priority cluster. A processor, responsive to determining the cluster is designated as the highest priority cluster, determines whether a main cluster of the set of clusters is online. A processor, responsive to determining the main cluster is online, scales a new custom resource to one (1).

DETAILED DESCRIPTION

Figure 1:
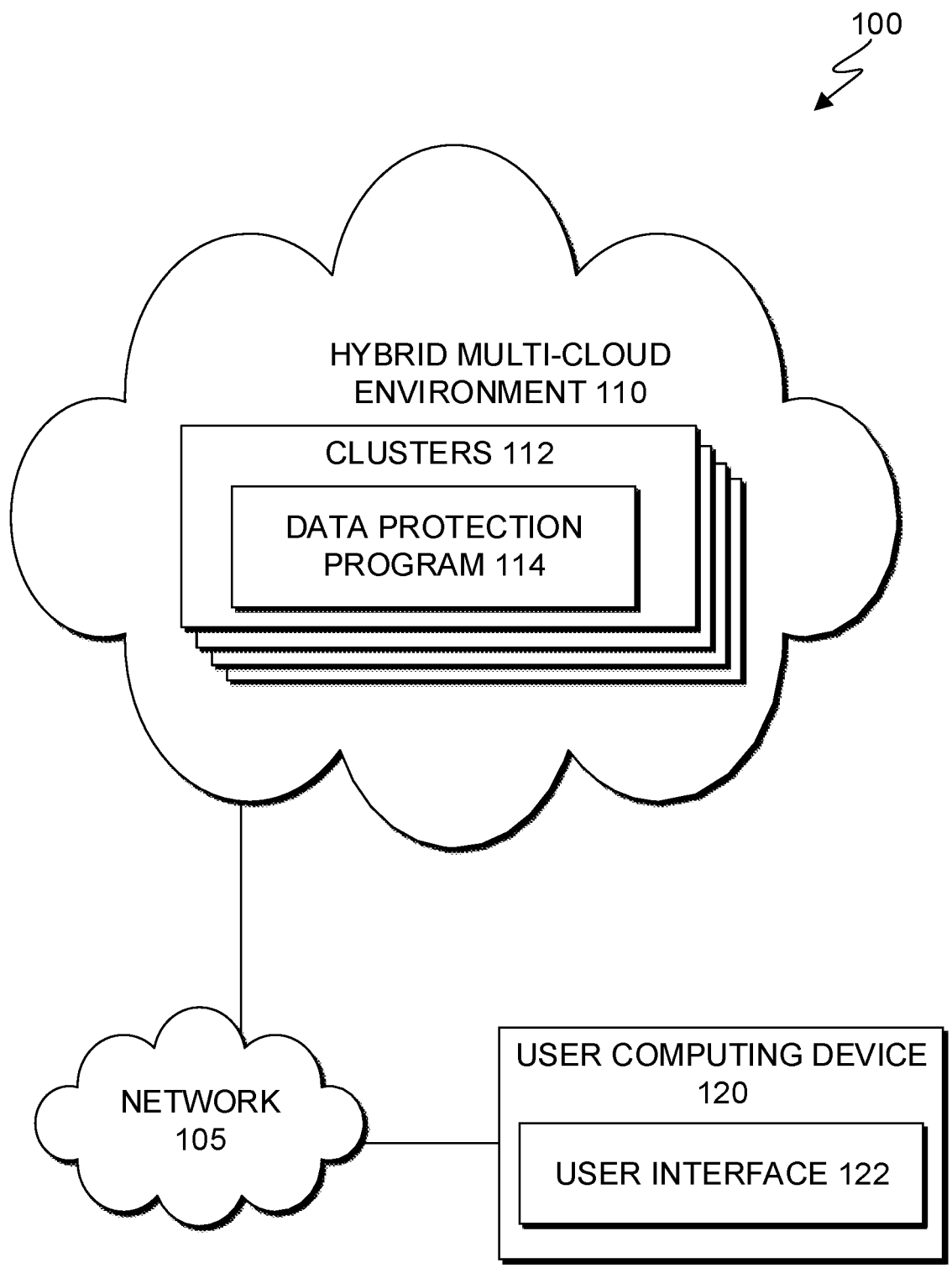
FIG. 1 is a functional block diagram illustrating a distributed data processing environment, in accordance with an embodiment of the present invention.

With the digital transformation and data exponential growth, businesses want to expand their computing capabilities beyond a data center's limit by storing data and computing on the Cloud, more often on many different clouds. Many technologies for multi-cloud, multi-cluster, and multi-geographies container application management exists, but these focus totally on stateless application movement across sites. To enable a truly hybrid multi-cloud environment, embodiments of the present invention recognize the need to also make stateful applications movement possible.

Embodiments of the present invention recognize that when deploying a distributed hybrid multi-cloud environment using Kubernetes clusters (also referred to as just "clusters" herein), the challenge of accessing persistent volumes (also known as "PersistentVolume" or "PV") across more than two clusters asynchronously is unsolved. This creates the problem where the PVs might become corrupted in the case of a simultaneous access to a file system without a proper locking method that is not possible in an asynchronous mode. Thus, embodiments of the present invention recognize the need on multi-cloud environments to maintain consistency and enable cloud mobility across geographies for stateful applications and databases that are not geographically dispersed aware.

Embodiments of the present invention provide a system and method that work with Kubernetes clusters to ensure the locking of persistent volumes that will control access to loosely coupled asynchronous replication. Even if an application with its database is migrated from one location to another cloud, embodiments of the present invention should prevent the access in any location if the application and database is not fully terminated in all other locations. Embodiments of the present invention ensure the access locking is generated, maintained, migrated, and released as and when required at the application level. This will help ensure data integrity and secure application mobility even for stateful applications when there are PV input/output (I/O) operations running.

Embodiments of the present invention enhance Kubernetes clusters functionalities across multiple geographies. Embodiments of the present invention provide an underlying asynchronous replication set across the clusters where it can spawn persistent volumes across different clouds, including private on-premises clouds. With different cloud vendors offering different Kubernetes cluster types, embodiments of the present invention enable application integrity locking between clouds through creation of a new Custom Resource (also known as "CustomResource" or "CR") on each Kubernetes cloud service that is controlled by embodiments of the present invention. The new Custom Resource has an operator on each cluster to expose an application programming interface (API) service to communicate state between clusters.

In Kubernetes, a resource is an endpoint in the Kubernetes API that stores a collection of API objects of a certain kind. A Custom Resource is an extension of the Kubernetes API that represents a customization of a particular Kubernetes installation. A Custom Resource is defined using the Custom Resource Definition (also known as CustomResourceDefinition or "CRD") API, in which defining a CRD object creates a new Custom Resource with a specified name and schema. CRDs allow users to create new types of resources without adding another API server.

Implementation of embodiments of the invention may take a variety of forms, and exemplary implementation details are discussed subsequently with reference to the Figures.

FIG. 1 is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes hybrid multi-cloud environment 110 and user computing device 120, interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between hybrid multi-cloud environment 110, user computing device 120, and other computing devices (not shown) within distributed data processing environment 100.

Hybrid multi-cloud environment 110 is a cloud computing environment with at least one public cloud and at least one private cloud. In an embodiment, hybrid multi-cloud environment 110 represents a server computing system utilizing multiple computers as a server system, such as in a cloud computing environment, capable of communicating with user computing device 120 and other computing devices (not shown) within distributed data processing environment 100 via network 105. In another embodiment, hybrid multi-cloud environment 110 represents a computing system utilizing clustered computers and components (e.g., database server computers, application server computers, etc.) that act as a single pool of seamless resources when accessed within distributed data processing environment 100. Hybrid multi-cloud environment 110 includes clusters 112. Hybrid multi-cloud environment 110 may include internal and external hardware components, as depicted and described in further detail with respect to FIGS. 3-5.

Clusters 112 operate as Kubernetes clusters that each contain a copy of data protection program 114 and the applications to be protected by data protection program 114. A Kubernetes cluster is a set of computing nodes that run containerized applications. In embodiments of the present invention, clusters 112 contains at least three clusters. A node of clusters 112 may include internal and external hardware components as depicted and described in further detail with respect to FIG. 5.

Data protection program 114 operates as a method for ensuring data protection and control in a distributed hybrid multi-cloud environment with Kubernetes clusters. In other words, data protection program 114 sets and controls entities that will protect applications running on the clusters that are controlled by StatefulSet or Deployment entities, which are the standard entities on the clusters used to protect applications on the clusters, such as clusters 112, that make use of PVs. This invention creates a new layer on top of StatefulSets or Deployments that will prevent corruption in a hybrid multi-cloud environment. In another embodiment, data protection program 114 may reside on another computing device, server, cloud server, or spread across multiple devices elsewhere (not shown) within distributed data processing environment 100, provided that data protection program 114 has access to network 105. In the depicted embodiment, data protection program 114 is a standalone program with a copy running on each cluster of clusters 112. In another embodiment, data protection program 114 may be integrated into another software product, e.g., a cloud service offering. A main operation of data protection program 114 is depicted and described in further detail with respect to FIG. 2. Before the main operation of data protection program 114 can occur, an initial set up is completed by a user, e.g., through user interface 122 of user computing device 120.

In an embodiment, data protection program 114 enables a user to complete an initial setup of a new CR defined using a CRD for use in a distributed hybrid multi-cloud environment with Kubernetes clusters, e.g., hybrid multi-cloud environment 110. As used herein "new CR" and "new CRD" refer to the new custom resource created and controlled by data protection program 114. The initial set up includes enabling a user (e.g., administrator) to set up the following settings for all clusters. In an embodiment, data protection program 114 enables a user to create a new CR. In an embodiment, data protection program 114 enables setting up an administrator with authorization to get, list, edit, and create the new CR on all clusters of a hybrid multi-cloud environment. In an embodiment, data protection program 114 enables a user to create (i.e., set) a Kubernetes operator (or just "operator"), which is a software extension to Kubernetes that makes use of custom resources to manage applications and their components, for controlling operation of the new CR. The Kubernetes operator ensures that data protection program 114 is running properly in each cluster of clusters 112.

In an embodiment, data protection program 114 enables the administrator to set cluster priority settings and a main cluster for the new CR. The cluster priority settings tell the operator the initial priority (i.e., which cluster) on where applications are running during normal operation. In an embodiment, data protection program 114 has two operation modes: (1) normal and (2) disaster recovery. When running in normal mode, data protection program 114 runs the new CR on the highest priority cluster, as defined by the administrator and disaster recovery is not declared. By setting the main cluster for the new CR, data protection program 114 enables setting which cluster has the source of data, given this is based on an asynchronous replication due to an extended distance between different clouds. For data consistency, there needs to be one cluster that is a "main owner" of the source of data that will always be the main point for asynchronous replication.

In an embodiment, data protection program 114 enables the administrator to set on the operator which clusters are part of the new CR, which will be a list of Kubernetes clusters part of the CR, in which the list contains all Kubernetes cluster API endpoints. Embodiments of the present invention assume there to be at least three clusters with quorum (a majority of clusters) being automatically calculated by the number of clusters on the list.

The CR declaration has at least two definitions. In an embodiment, data protection program 114 enables the administrator to define, in a Kubernetes cluster, (1) one or more persistent volumes (PVs) and persistent volume claims (PVCs) and (2) one or more StatefulSets or Deployments entities. Both (1) and (2) are Kubernetes entities that define the application(s) running and, in embodiments herein, are controlled by data protection program 114. These definitions can also be imported when the CRD is initially created. The initial number of replicas (i.e., pods) of an application expected for the Deployment or StatefulSet when the new CR is scaled to one (1) must be defined. If the new CR is scaled to zero (0), data protection program 114 sets the Deployments or StatefulSet replicas to zero (0).

In an embodiment, data protection program 114 enables the administrator to set an application migration which causes an application migration command to redefine cluster priorities (i.e., determine a new highest priority cluster as defined by the administrator in the application migration) across all the Kubernetes clusters, so that data protection program 114 will automatically enforce the correct application migration to the new highest priority cluster. For example, data protection program 114 enables an administrator to set a migration for an application from Cloud A to Cloud B within hybrid multi-cloud environment 110. By enabling the administrator to set an application migration, data protection program 114 enables the administrator to change an application location.

User computing device 120 operates as a computing device associated with a user on which the user can interact with data protection program 114 through an application user interface. In the depicted embodiment, user computing device 120 includes an instance of user interface 122. In an embodiment, user computing device 120 can be a laptop computer, a tablet computer, a smart phone, a smart watch, an e-reader, smart glasses, wearable computer, or any programmable electronic device capable of communicating with various components and devices within distributed data processing environment 100, via network 105. In general, user computing device 120 represents one or more programmable electronic devices or combination of programmable electronic devices capable of executing machine readable program instructions and communicating with other computing devices (not shown) within distributed data processing environment 100 via a network, such as network 105.

User interface 122 provides an interface between data protection program 114 on hybrid multi-cloud environment 110 and a user of user computing device 120. In one embodiment, user interface 122 is a mobile application software. Mobile application software, or an "app," is a computer program designed to run on smart phones, tablet computers, and other mobile computing devices. In one embodiment, user interface 122 may be a graphical user interface (GUI) or a web user interface (WUI) that can display text, documents, web browser windows, user options, application interfaces, and instructions for operation, and include the information (such as graphic, text, and sound) that a program presents to a user and the control sequences the user employs to control the program. User interface 122 enables a user of user computing device 120 to complete an initial setup of data protection program 114 and/or act as an administrator of data protection program 114. User interface 122 enables a user of user computing device 120 to view or manage functions and/or output of data protection program 114 as needed, e.g., a user can declare a Disaster Recovery if necessary.

Figure 2:
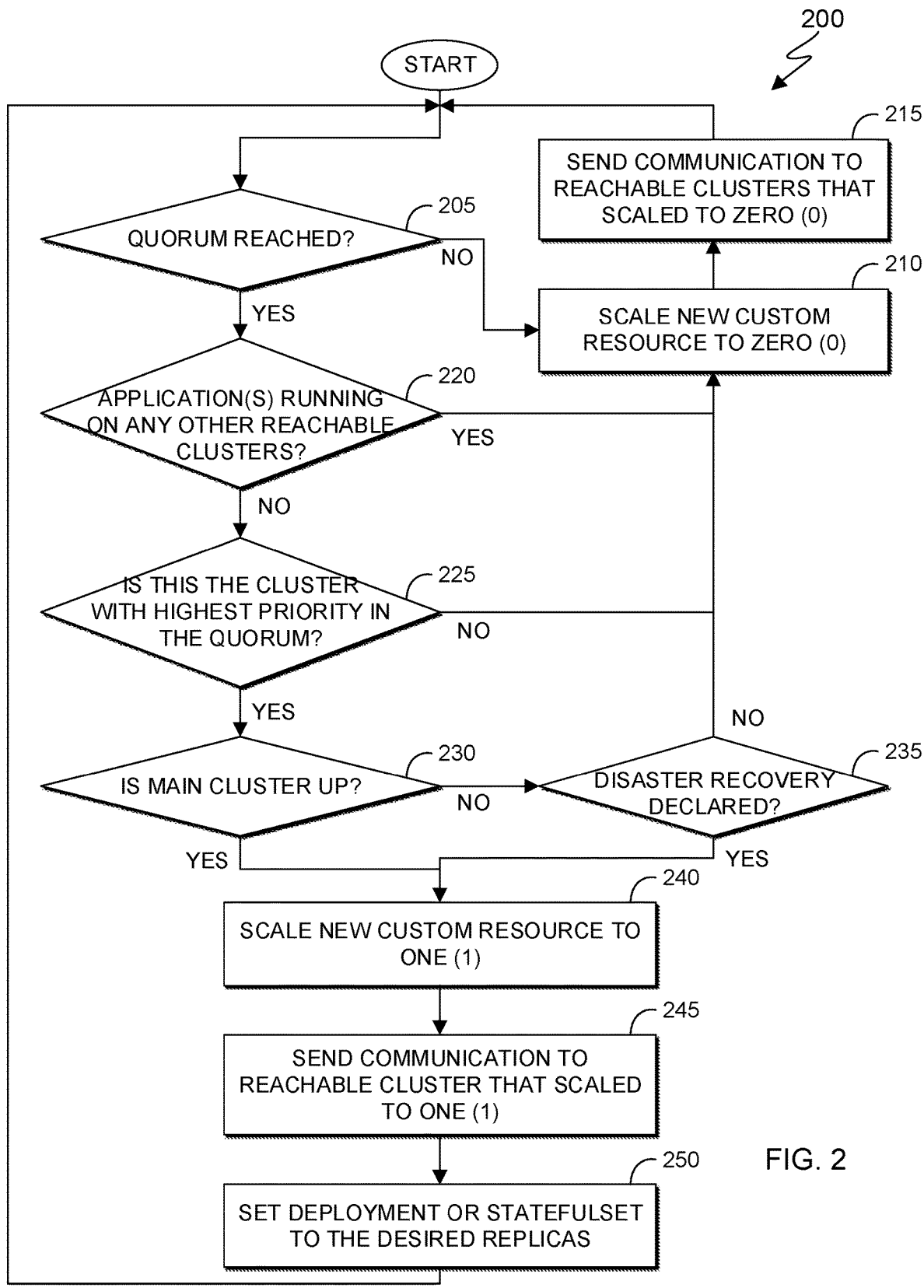
FIG. 2 is a flowchart depicting operational steps of a data protection program, for utilizing a new custom resource to control application integrity locking in a distributed hybrid multi-cloud environment with Kubernetes clusters, in accordance with an embodiment of the present invention.

FIG. 2 is a flowchart 200 depicting operational steps of data protection program 114, for utilizing the new CR to control application integrity locking in a distributed hybrid multi-cloud environment with Kubernetes clusters, in accordance with an embodiment of the present invention. It should be appreciated that the process depicted in FIG. 2 illustrates one possible iteration of data protection program 114 running on each of clusters 112, in which this process is from the perspective of one cluster at a time.

In decision 205, data protection program 114 determines whether there is a quorum of clusters. In an embodiment, data protection program 114 determines whether there is a quorum of "healthy" (i.e., can communicate with each other) or online clusters of clusters 112. A quorum of clusters is defined to be a majority of clusters 112, i.e., more than 50% of clusters 112, e.g., if there are three clusters than two clusters must be online to have a quorum. In an embodiment, data protection program 114 receives an indication from the Kubernetes operator on the cluster of whether there is a quorum among the online clusters.

If data protection program 114 determines there is not a quorum (decision 205, NO branch), then data protection program 114 proceeds to step 210. In step 210, data protection program 114 scales the CR to zero (0) on the cluster that did not determine there to be a quorum to ensure consistency of the data given, then proceeds to step 215. In step 215, data protection program 114 sends a communication to all reachable clusters (i.e., clusters that respond to the communication because they are online) that the CR is down on this cluster, and then proceeds back to wait until a quorum is reached.

If data protection program 114 determines there is a quorum (decision 205, YES branch), then data protection program 114 proceeds to decision 220. In decision 220, data protection program 114 determines if the one or more applications are running on any other reachable cluster. If data protection program 114 determines the one or more applications are running on any other reachable cluster (decision 220, YES branch), then data protection program 114 proceeds to step 210 (as described above) to scale the CR to zero (0) to ensure consistency and that the one or more applications being protected are up only in one cluster. Thus, by setting the CR to zero (0) for the cluster, data protection program 114 is protecting the one or more applications from corruption.

If data protection program 114 determines the application is not running on any other reachable cluster (decision 220, NO branch), then data protection program 114 proceeds to decision 225. In decision 225, data protection program 114 determines if this is the cluster with the highest priority within the quorum. In an embodiment, data protection program 114 determines if this is the cluster with the highest priority within the quorum by checking which cluster was set as highest priority by the administrator, e.g., a user set as the administrator through user interface 122 on user computing device 120. If data protection program 114 determines this is not the cluster with the highest priority within the quorum (decision 225, NO branch), then data protection program 114 proceeds to step 210 (as described above) to scale the CR to zero (0) since the cluster with highest priority within the quorum should be the only cluster to bring the one or more applications up, i.e., run the one or more applications.

If data protection program 114 determines that this is the cluster with the highest priority within the quorum (decision 225, YES branch), then data protection program 114 proceeds to decision 230. In decision 230, data protection program 114 determines if the main cluster is up. In an embodiment, data protection program 114 determines if the main cluster is up, i.e., online, and ready for running the one or more applications. The main cluster is the cluster on which the source of data is stored and was defined during the initial set-up by the administrator.

If data protection program 114 determines that the main cluster is not up (decision 230, NO branch), then data protection program 114 proceeds to decision 235. In decision 235, data protection program 114 determines if a Disaster Recovery (DR) is declared, e.g., by the administrator who sets the mode of operation for data protection program 114. If the administrator has put data protection program 114 in normal mode of operation, then a DR is not declared. If the administrator has put data protection program 114 in DR mode of operation, then a DR is declared, which essentially means that the administrator does not think the main cluster is online or will be online. If data protection program 114 determines that a DR is not declared (decision 235, NO branch), then data protection program 114 proceeds to step 210 (as described above) to scale the CR to zero (0).

If data protection program 114 determines that the main cluster is up (decision 230, YES branch) OR if data protection program 114 determines that a DR is declared (decision 235, YES branch), then data protection program 114 proceeds to step 240. In step 240, data protection program 114 scales the CR to one (1), then proceed to step 245. In step 245, data protection program 114 sends a communication to all reachable clusters that the application is scaled to one (1), then proceed to step 250. In step 250, data protection program 114 sets the Deployment or StatefulSet entities (whichever entity the cluster has) to the desired replicas (i.e., number of Pods set by a user during configuration, which depends on the needs of the application to be protected) ensuring that only one of the Kubernetes clusters within the hybrid multi-cloud environment will access the Persistent Volume Claim (PVC) to guarantee the integrity of the one or more applications. In an embodiment, data protection program 114 enables applications to start running by setting the StatefulSet or Deployment entities to the desired replicas set during the configuration. In other words, the CR is active on the cluster scaled to one (1) and the application is running in that cluster, owning the data, while the other clusters are set to zero (0). This will enforce the applications to remain down, because the CR will set the StatefulSet or Deployment entities to zero (0). After step 250 is completed, data protection program 114 loops back to the beginning to continue checking the conditions as described above for the cluster.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
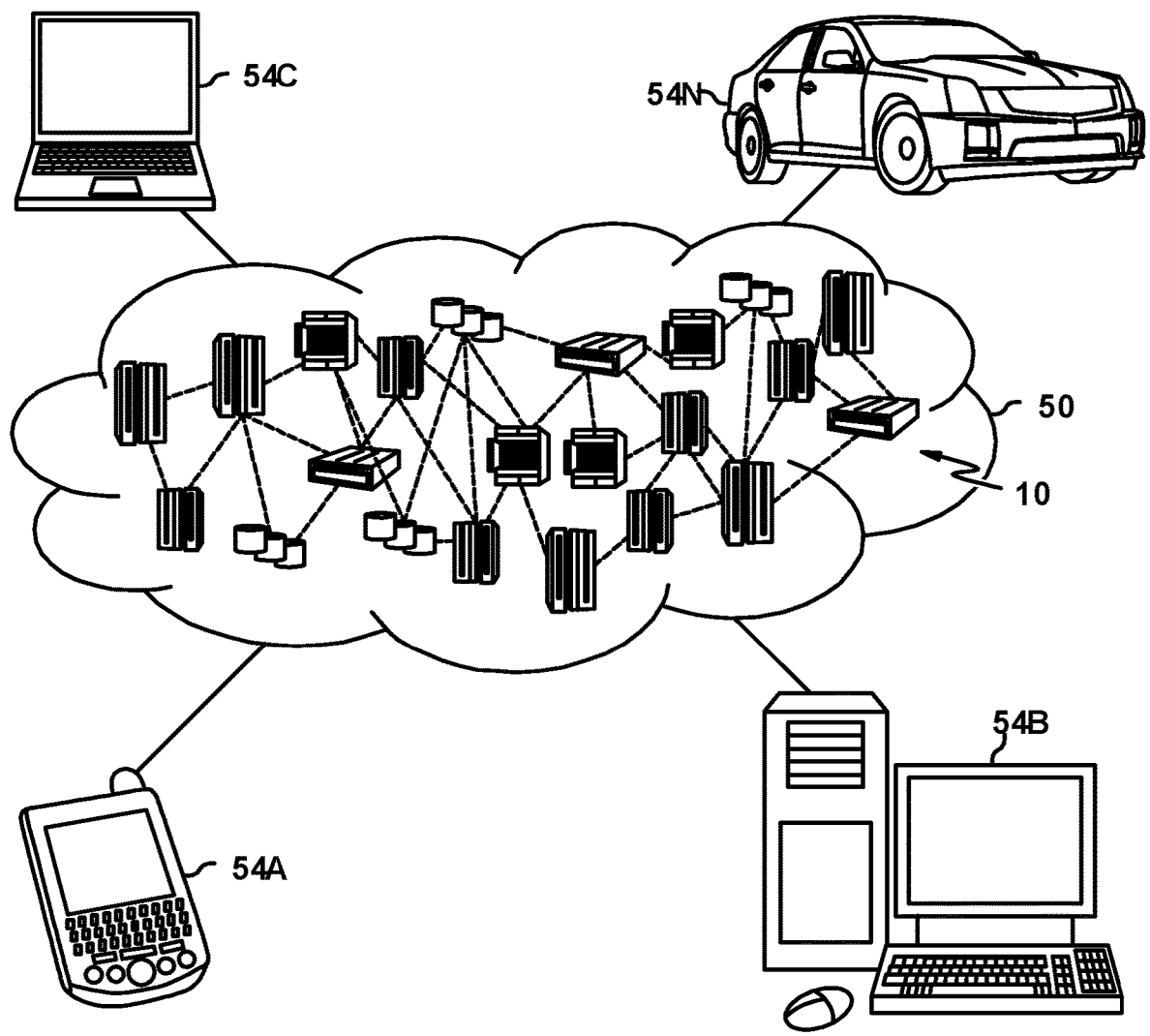
FIG. 3 depicts a cloud computing environment, in accordance with an embodiment of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 4:
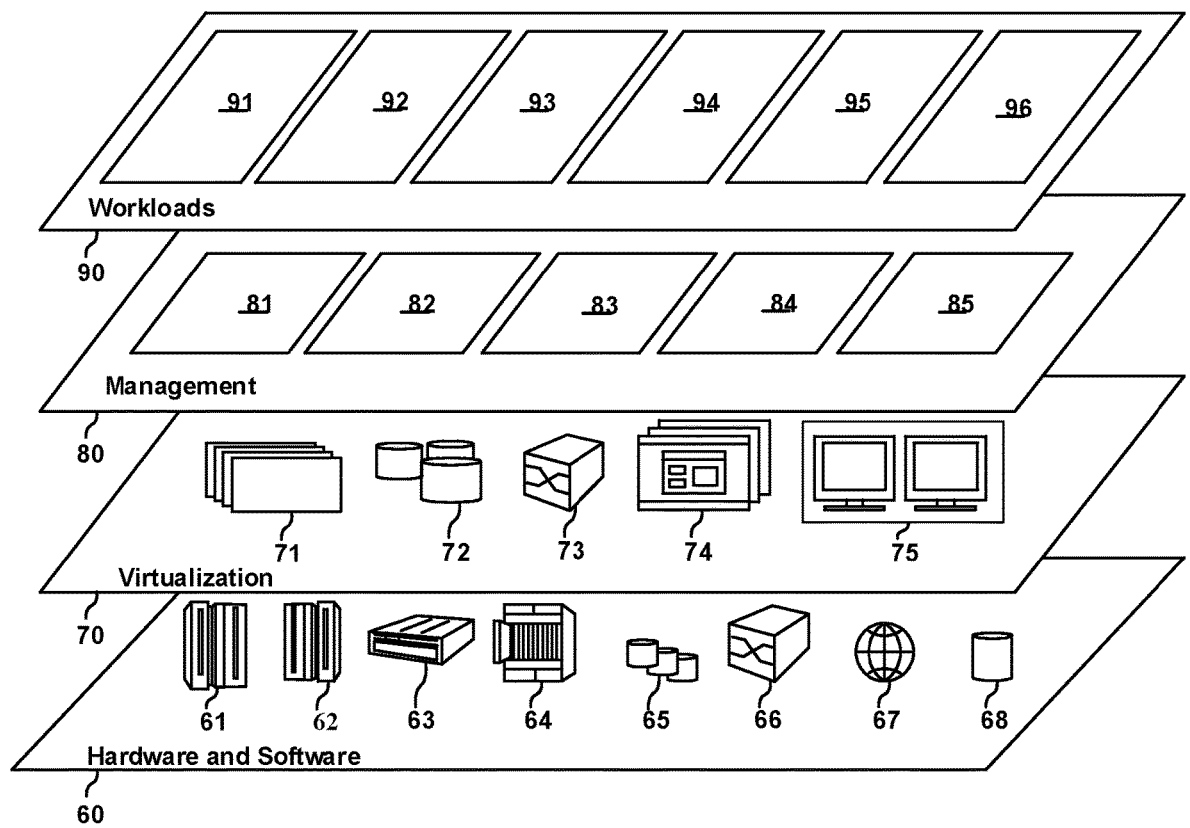
FIG. 4 depicts abstraction model layers, in accordance with an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data protection processing 96.

Figure 5:
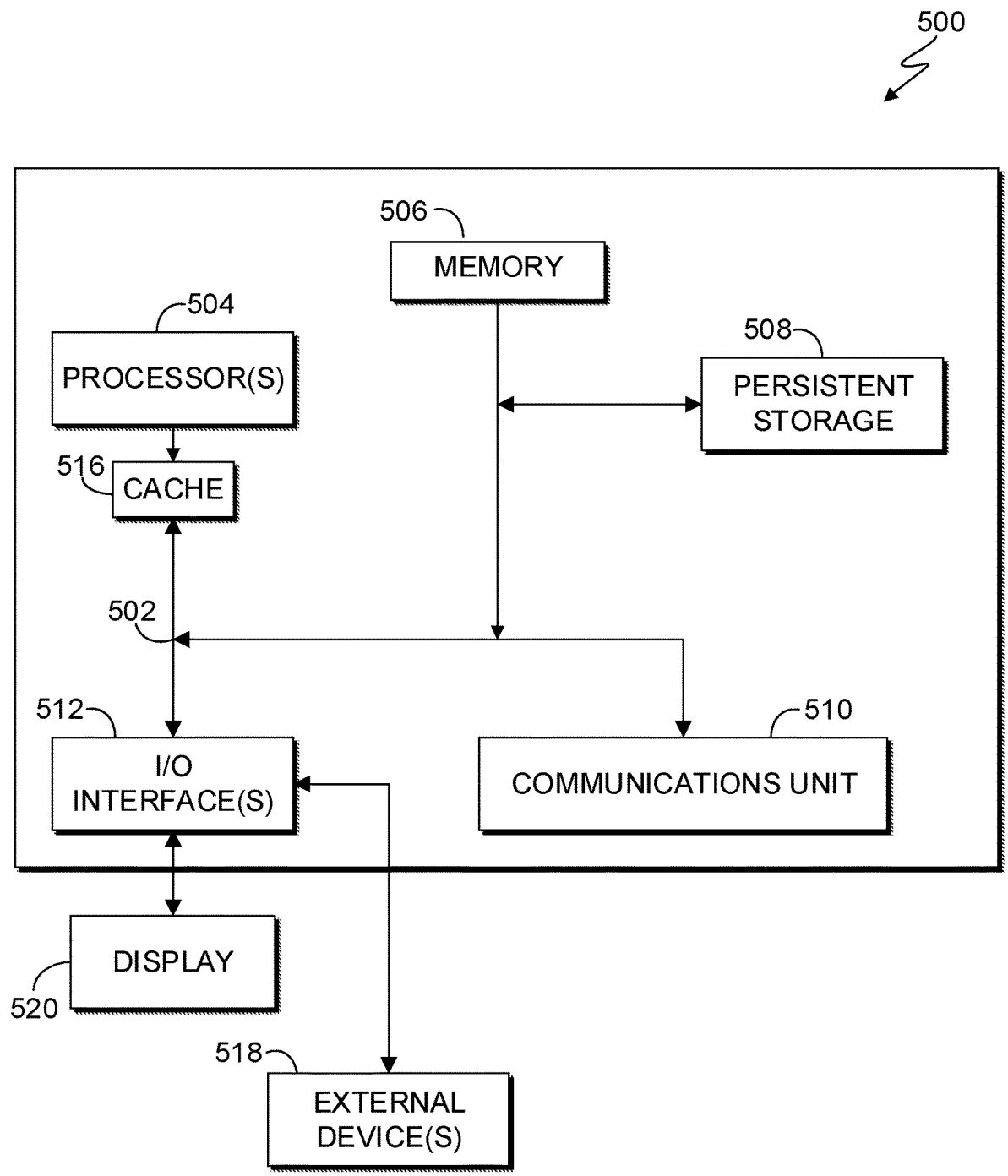
FIG. 5 depicts a block diagram of components of a computing node of a cloud computing environment within the distributed data processing environment of FIG. 1, for running the data protection program, in accordance with an embodiment of the present invention.

FIG. 5 depicts a block diagram of components of one of cloud computing nodes 10, suitable for running data protection program 114 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs may be downloaded to persistent storage 508 through communications unit 510.

I/O interface(s) 512 allows for input and output of data with other devices that may be connected to one of cloud computing nodes 10. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method, the method comprising:
   implementing, by one or more processors, application integrity locking between clusters of a set of clusters in a hybrid cloud environment through a new custom resource set up by a user that exposes an application programming interface (API) service to communicate a state between the clusters of the set of clusters, wherein implementing the application integrity locking between the clusters comprises, at each cluster:
      determining, by the one or more processors, whether a respective quorum of the set of clusters are online;
      responsive to determining that a respective quorum of the set of clusters are online, determining, by the one or more processors, whether one or more applications of the cluster are running on other clusters of the set of clusters;
      responsive to determining that the one or more applications of the cluster are not running on the other clusters of the set of clusters, determining, by the one or more processors, whether the cluster is designated as a highest priority cluster;
      responsive to determining that the cluster is designated as the highest priority cluster, determining, by the one or more processors, whether a main cluster of the set of clusters is online, wherein the main cluster is the respective cluster on which a source of data is stored; and
      responsive to determining that the main cluster is online, scaling, by the one or more processors, the new custom resource to one (1).

2. The method of claim 1, wherein implementing the application integrity locking between the clusters further comprises, at each cluster:
   sending, by the one or more processors, a communication to each cluster of the set of clusters that are online stating that the new custom resource has been scaled to one (1); and
   setting, by the one or more processors, deployment entity or statefulset entity to desired replicas.

3. The method of claim 1, wherein responsive to determining that the respective quorum of the set of clusters are not online:
   scaling, by the one or more processors, the new custom resource to zero (0) on the cluster; and
   sending, by the one or more processors, a communication to each cluster of the set of clusters that are online, wherein the communication includes that the new custom resource has been scaled to zero (0).

4. The method of claim 1, wherein responsive to determining that the one or more applications of the cluster are running on the other clusters of the set of clusters:
   scaling, by the one or more processors, the new custom resource to zero (0) on the cluster; and
   sending, by the one or more processors, a communication to each cluster of the set of clusters that are online, wherein the communication includes that the new custom resource has been scaled to zero (0).

5. The method of claim 1, wherein responsive to determining the cluster is not designated as the highest priority cluster:
   scaling, by the one or more processors, the new custom resource to zero (0) on the cluster; and
   sending, by the one or more processors, a communication to each cluster of the set of clusters that are online, wherein the communication includes that the new custom resource has been scaled to zero (0).

6. The method of claim 1, wherein responsive to determining that the main cluster is not online, determining, by the one or more processors, whether a disaster recovery mode is running.

7. The method of claim 6, wherein responsive to determining that the disaster recovery mode is not running:
   scaling, by the one or more processors, the new custom resource to zero (0) on the cluster; and
   sending, by the one or more processors, a communication to each cluster of the set of clusters that are online, wherein the communication includes that the new custom resource has been scaled to zero (0).

8. A computer program product, the computer program product comprising:
   one or more computer readable storage media and program instructions collectively stored on the one or more computer readable storage media, wherein the one or more computer readable storage media is not to be construed as transitory per se, the stored program instructions comprising:

program instructions to implement application integrity locking between clusters of a set of clusters in a hybrid cloud environment through a new custom resource set up by a user that exposes an application programming interface (API) service to communicate a state between the clusters of the set of clusters, wherein the program instructions to implement the application integrity locking between the clusters comprise, at each cluster:

program instructions to determine whether a respective quorum of the set of clusters are online;

responsive to determining that a respective quorum of the set of clusters are online, program instructions to determine whether one or more applications of the cluster are running on other clusters of the set of clusters;

responsive to determining that the one or more applications of the cluster are not running on the other clusters of the set of clusters, program instructions to determine whether the cluster is designated as a highest priority cluster;

responsive to determining that the cluster is designated as the highest priority cluster, program instructions to determine whether a main cluster of the set of clusters is online, wherein the main cluster is the respective cluster on which a source of data is stored; and responsive to determining that the main cluster is online, program instructions to scale the new custom resource to one (1).

9. The computer program product of claim 8, wherein the program instructions to implement the application integrity locking between the clusters further comprise, at each cluster:

program instructions to send a communication to each cluster of the set of clusters that are online stating that the new custom resource has been scaled to one (1); and program instructions to set deployment entity or statefulset entity to desired replicas.

10. The computer program product of claim 8, wherein responsive to determining that the respective quorum of the set of clusters are not online:

program instructions to scale the new custom resource to zero (0) on the cluster; and program instructions to send a communication to each cluster of the set of clusters that are online, wherein the communication includes that the new custom resource has been scaled to zero (0).

11. The computer program product of claim 8, wherein responsive to determining that the one or more applications of the cluster are running on the other clusters of the set of clusters:

program instructions to scale the new custom resource to zero (0) on the cluster; and program instructions to send a communication to each cluster of the set of clusters that are online, wherein the communication includes that the new custom resource has been scaled to zero (0).

12. The computer program product of claim 8, wherein responsive to determining that the cluster is not designated as the highest priority cluster:

program instructions to scale the new custom resource to zero (0) on the cluster; and program instructions to send a communication to each cluster of the set of clusters that are online, wherein the communication includes that the new custom resource has been scaled to zero (0).

13. The computer program product of claim 8, wherein responsive to determining that the main cluster is not online, program instructions to determine whether a disaster recovery mode is running.

14. The computer program product of claim 13, wherein responsive to determining that the disaster recovery mode is not running:

program instructions to scale the new custom resource to zero (0) on the cluster; and program instructions to send a communication to each cluster of the set of clusters that are online, wherein the communication includes that the new custom resource has been scaled to zero (0).

15. A computer system comprising:

one or more computer processors;

one or more computer readable storage media, wherein the one or more computer readable storage media is not to be construed as transitory per se;

program instructions collectively stored on the one or more computer readable storage media for execution by at least one of the one or more computer processors, the stored program instructions comprising:

program instructions to implement application integrity locking between clusters of a set of clusters in a hybrid cloud environment through a new custom resource set up by a user that exposes an application programming interface (API) service to communicate a state between the clusters of the set of clusters, wherein the program instructions to implement the application integrity locking between the clusters comprise, at each cluster:

program instructions to determine whether a respective quorum of the set of clusters are online;

responsive to determining that a respective quorum of the set of clusters are online, program instructions to determine whether one or more applications of the cluster are running on other clusters of the set of clusters;

responsive to determining that the one or more applications of the cluster are not running on the other clusters of the set of clusters, program instructions to determine whether the cluster is designated as a highest priority cluster;

responsive to determining that the cluster is designated as the highest priority cluster, program instructions to determine whether a main cluster of the set of clusters is online, wherein the main cluster is the respective cluster on which a source of data is stored; and responsive to determining that the main cluster is online, program instructions to scale the new custom resource to one (1).

16. The computer system of claim 15, wherein the program instructions to implement the application integrity locking between the clusters further comprise, at each cluster:

program instructions to send a communication to each cluster of the set of clusters that are online stating that the new custom resource has been scaled to one (1); and program instructions to set deployment entity or statefulset entity to desired replicas.

17. The computer system of claim 15, wherein responsive to determining that the respective quorum of the set of clusters are not online:

program instructions to scale the new custom resource to zero (0) on the cluster; and program instructions to send a communication to each cluster of the set of clusters that are online, wherein the communication includes that the new custom resource has been scaled to zero (0).

18. The computer system of claim 15, wherein responsive to determining that the one or more applications of the cluster are running on the other clusters of the set of clusters:
    program instructions to scale the new custom resource to zero (0) on the cluster; and
    program instructions to send a communication to each cluster of the set of clusters that are online, wherein the communication includes that the new custom resource has been scaled to zero (0).

19. The computer system of claim 15, wherein responsive to determining that the cluster is not designated as the highest priority cluster:
    program instructions to scale the new custom resource to zero (0) on the cluster; and
    program instructions to send a communication to each cluster of the set of clusters that are online, wherein the communication includes that the new custom resource has been scaled to zero (0).

20. The computer system of claim 15, wherein the program instructions to implement the application integrity locking between the clusters further comprise, at each cluster:
    responsive to determining that the main cluster is not online, program instructions to determine whether a disaster recovery mode is running; and
    responsive to determining that the disaster recovery mode is not running:
        program instructions to scale the new custom resource to zero (0) on the cluster, and
        program instructions to send a communication to each cluster of the set of clusters that are online, wherein the communication includes that the new custom resource has been scaled to zero (0).

* * * * *